(12) United States Patent
Arnaud et al.

(10) Patent No.: US 12,549,249 B2
(45) Date of Patent: Feb. 10, 2026

(54) METHOD FOR PRE-COMPENSATING TIME DIFFERENCES

(71) Applicant: THALES, Courbevoie (FR)

(72) Inventors: Mathieu Arnaud, Toulouse (FR); Benjamin Baudry, Toulouse (FR)

(73) Assignee: THALES, Courbevoie (FR)

( * ) Notice: Subject to any disclaimer, the term of this patent is extended or adjusted under 35 U.S.C. 154(b) by 563 days.

(21) Appl. No.: 18/076,316

(22) Filed: Dec. 6, 2022

(65) Prior Publication Data

US 2023/0188206 A1     Jun. 15, 2023

(30) Foreign Application Priority Data

Dec. 9, 2021   (FR) .................................. 2113204

(51) Int. Cl.
*H04B 7/185*   (2006.01)

(52) U.S. Cl.
CPC ....... *H04B 7/18558* (2013.01); *H04B 7/1855* (2013.01); *H04B 7/18573* (2013.01)

(58) Field of Classification Search
CPC ......... H04W 76/10; H04W 4/24; H04W 8/26; H04W 12/69; G06F 16/9566; H04M 15/41
See application file for complete search history.

(56) References Cited

U.S. PATENT DOCUMENTS

| | | | | |
|---|---|---|---|---|
| 2015/0270890 A1* | 9/2015 | Vasavada | ............. | H04B 7/1851 370/326 |
| 2016/0278033 A1* | 9/2016 | Wu | ................... | H04W 56/0045 |
| 2018/0013484 A1 | 1/2018 | Vasavada et al. | | |
| 2018/0241464 A1* | 8/2018 | Michaels | ........... | H04B 7/18539 |
| 2019/0238216 A1 | 8/2019 | Avellan et al. | | |
| 2021/0297147 A1* | 9/2021 | Qaise | ................. | H04B 7/18539 |
| 2022/0360320 A1* | 11/2022 | Miao | ................. | H04W 56/0035 |
| 2023/0268981 A1* | 8/2023 | Park | ..................... | H04L 5/0051 370/316 |

FOREIGN PATENT DOCUMENTS

| | | |
|---|---|---|
| CA | 3 003 667 A1 | 5/2017 |
| WO | 2020/075044 A1 | 4/2020 |
| WO | 2020/089471 A1 | 5/2020 |
| WO | 2021/033085 A1 | 2/2021 |
| WO | 2021/062666 A1 | 4/2021 |

OTHER PUBLICATIONS

Yeo, Woon-Young, and Dong-Jun Lee. "Uplink Time Synchronization Based on Time Drift Measurements in Non-Terrestrial Networks." IEEE Access (2024). (Year: 2024).*

Dong, Jian, and Jie Yang. "Cascaded phase modulation for AMCC superimposition toward MFH employing CPRI." IEEE Photonics Journal 9.4 (2017): 1-6. (Year: 2017).*

Gaudenzi, et al., "Future technologies for very high throughput satellite systems", International Journal of Satellite Communications and Networking, vol. 38, Issue 2, pp. 141-161, 2020.

* cited by examiner

*Primary Examiner* — Sharad Rampuria
(74) *Attorney, Agent, or Firm* — BakerHostetler

(57) ABSTRACT

A method is provided for compensating time differences for the time alignment of uplink service frames and downlink service frames, the uplink service frames and the downlink service frames being exchanged between a satellite and a mobile terminal. The mobile terminal belonging to a 5G cell comprising a cell centre, the pre-compensation is calculated on the basis of a main beam directed towards the centre (O) of the cell (5G).

13 Claims, 8 Drawing Sheets

METHOD FOR PRE-COMPENSATING TIME DIFFERENCES

CROSS-REFERENCE TO RELATED APPLICATION

This application claims priority to foreign French patent application No. FR 2113204, filed on Dec. 9, 2021, the disclosure of which is incorporated by reference in its entirety.

FIELD OF THE INVENTION

The present invention relates to a method for pre-compensating time differences for the time alignment of uplink service frames and downlink service frames exchanged between a satellite and a mobile terminal.

BACKGROUND

Satellite systems for mobile terminals are currently proprietary and not interoperable, or poorly interoperable, between different satellite systems or with terrestrial mobile networks. Existing mobile terminals and network equipment are expensive and specialized. This limits them to niche markets and prevents their use as a solution for the consumer market.

The standardization body for mobile networks known as 3GPP (for "3rd Generation Partnership Project") is attempting to respond to this problem by proposing modifications to the 5G (fifth generation of mobile networks) standard, to make it compatible in relation to satellite systems. Modifications will then have to be made to all components of the system. Accordingly, the NTN ("Non-Terrestrial Networks") working group of 3GPP is currently drawing up a new version of the 3GPP standard, in the form of Version 17, to enable the use of 5G by satellite. This version provides modifications regarding the various components of the communication system. It is known that a communication system for 5G communication comprises a core network and at least one base station. In a satellite system, the communication system also comprises at least one gateway positioned between the base station and the satellite. In this way, the communication system allows 5G communication between mobile terminals and the core network.

Even if modifications are made to the 3GPP standard, the mobile terminals, the core network and the base station have not been designed and developed for satellite propagation channels, or for handling the continual changes in network topology caused by a constellation of non-geostationary satellites.

Consequently, there is a need to propose a solution for minimizing the effects of the support for 5G satellite access on the base station and the mobile terminal, in order to allow standard equipment to be re-used.

SUMMARY OF THE INVENTION

The present invention is intended to provide at least a partial answer to this need.

More particularly, the object of the present invention is to facilitate the adoption of satellite access by the 3GPP cellular ecosystem.

For this purpose, a first object of the invention relates to a method for pre-compensating time differences for the time alignment of uplink service frames and downlink service frames, said uplink service frames and said downlink service frames being exchanged between a satellite and a mobile terminal in a main beam, said mobile terminal being adapted for providing 5G communications. The mobile terminal belongs to a 5G cell comprising a cell centre, and the pre-compensation is calculated on the basis of a main beam directed towards the centre of said 5G cell.

In a particular embodiment, the pre-compensation is carried out on the downlink service frames and/or on the uplink service frames.

In a particular embodiment, the pre-compensation is calculated on the basis of a position, a velocity and/or an acceleration of the satellite.

In a particular embodiment, the pre-compensation is a Doppler pre-compensation for compensating frequency differences.

In a particular embodiment, the Doppler pre-compensation step is calculated on the basis of at least one parameter from a list of parameters comprising:

a position of the satellite;
a velocity of the satellite;
an acceleration of the satellite;
a central frequency;
the position of the centre of the cell.

Another object of the invention relates to a pre-compensation device for compensating time differences for the time alignment of uplink service frames and downlink service frames. The uplink service frames and the downlink service frames are exchanged between a satellite and a mobile terminal. The mobile terminal is adapted for providing 5G communications with the access network. The mobile terminal belongs to a 5G cell comprising a cell centre, and the pre-compensation is calculated on the basis of a main beam directed towards the centre of said 5G cell.

Another object of the invention relates to a payload comprising a pre-compensation device according to the invention.

Another object of the invention relates to a communication system for 5G communication between at least one mobile terminal and an access network comprising a plurality of base stations. The communication system comprises at least one satellite, at least one base station of the plurality of base stations, and a gateway positioned between said satellite and said base station. The satellite and the gateway are capable of exchanging feeder link frames. The mobile terminal and the satellite are capable of exchanging service frames in a main beam. The satellite is at the interface between the feeder link frames and the service frames for exchanging data between the mobile terminal and the base station, said service frames comprising uplink service frames and downlink service frames, where said uplink service frames must be time-aligned with said downlink service frames. The communication system comprises a pre-compensation device adapted for compensating time differences for the purpose of time-aligning the uplink service frames and the downlink service frames, and wherein, the mobile terminal belonging to a 5G cell comprising a cell centre, the pre-compensation is calculated on the basis of a main beam directed towards the centre of the 5G cell.

In a known way, the base station of a 5G communication system is composed of a central unit, a distributed unit for the baseband, and a radio unit. The radio unit is carried by a payload of the satellite, thereby enabling the main functions of the base station, the central unit and the distributed unit to be kept on the ground in order to optimize the overall cost of the system. In order to handle the variable delays, which may be significant (several milliseconds), between the radio unit and the baseband on the ground, owing to the integration of the radio unit into the satellite, a compensating mechanism is provided to compensate for the time differences in the exchange of the feeder link frames. This mechanism may be used to mask said time differences from the mobile terminal, which then has no need to compensate for these differences directly. In the 3GPP 5G standard, the 5G interface reference point is a point where the uplink service frames are time-aligned with the downlink service frames in a frequency division duplex (FDD) system. Furthermore, the alignment of the frames in the uplink direction between the various terminals of a 5G cell is necessary in order to avoid interference between them. In the 3GPP standard, in order to comply with the alignment at the 5G interface time reference point, the mobile terminal must use an advance (called the "timing advance") on the transmission in the uplink direction. This advance is controlled and corrected by the base station on the basis of the offset measured by said base station in the reception of frames, in order to compensate for a round-trip delay between the mobile terminal and the 5G interface time reference point. In a terrestrial 5G system, the reference point is located at an antenna of the base station, and is thus very close to the baseband, so that the propagation delay between the two can be disregarded. In such a terrestrial 5G system, having a reference point at a different location from the base station (on the ground) would mean that this base station would have to take into account, in a dynamic way, the delay between this reference point and the base station at the time of planning (or "scheduling") the frames. This scheduling typically takes place every millisecond. In a satellite system, therefore, it is essential to know the delay on the feeder link between the gateway and the satellite, on the basis of the knowledge of the current position of the satellite and the base station, or by measuring the transport delay on the link, and to be able to adapt the scheduling as a function of the actual delay, which may be difficult to do.

BRIEF DESCRIPTION OF THE DRAWINGS

The present invention will be more readily understood from the perusal of the detailed description of embodiments provided by way of non-limiting examples and illustrated by the attached drawings, in which.

The invention is not limited to the embodiments and variants described, and other embodiments and variants will be evident to persons skilled in the art.

DETAILED DESCRIPTION

Figure 1:
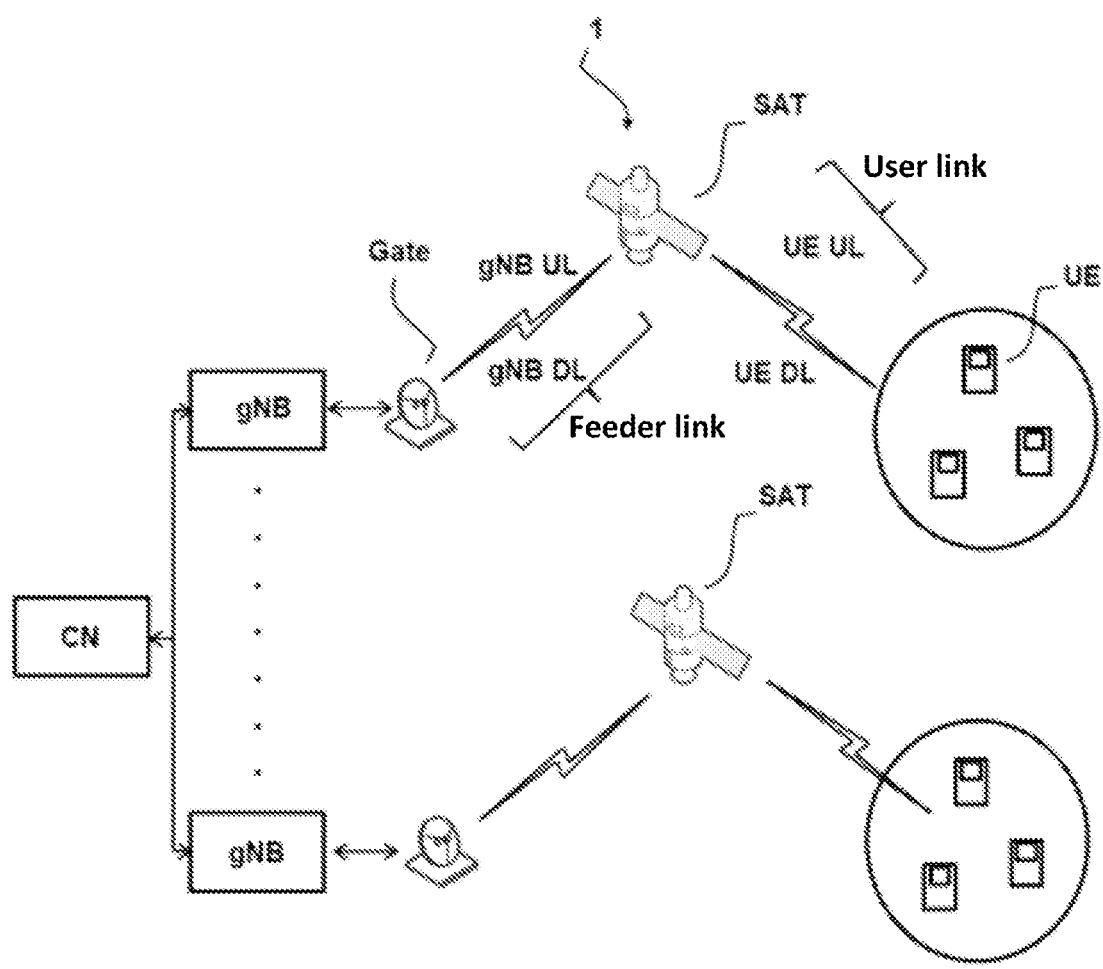
FIG. 1 shows a communication system according to the invention for 5G communication between at least one mobile terminal and an access network, via a satellite.

FIG. 1 shows a communication system 1 for 5G communication between a core network CN and a mobile terminal UE. The core network CN allows interconnection with different service providers. It comprises a plurality of routers and switches for providing functions of aggregation, authentication, control, billing, service invocation and/or gateways. The mobile terminal UE is adapted for receiving and exchanging service frames; more particularly, these service frames may be uplink service frames UE UL transmitted by the mobile phone UE or downlink service frames UE DL received by this mobile phone UE. The uplink service frames UE UL are time-aligned with the downlink service frames UE DL.

The communication system 1 comprises:
at least one satellite SAT;
a plurality of gateways Gate;
a plurality of base stations gNB forming an access network.

The satellite SAT is adapted for transmitting downlink service frames UE DL to the mobile phone UE. The satellite SAT is also adapted for receiving uplink service frames UE UL transmitted by the mobile equipment UE. The uplink service frames UE UL and the downlink service frames UE DL use, for example, a frequency band from 2 GHz to 4 GHz (the S band). In a variant, the uplink service frames UE UL and the downlink service frames UE DL use the C band frequencies. Other frequency bands may also be used, such as the L band (1.5-1.7 GHz), or MS bands (terrestrial cellular). The satellite SAT is also adapted for handling feeder link frames exchanged with the base stations gNB. These feeder link frames comprise uplink feeder link frames gNB UL, transmitted by the base stations gNB towards the satellite SAT, and downlink feeder link frames gNB DL, transmitted by the satellite SAT towards the base stations gNB. The feeder link frames use the Ka band, via a protocol of the type known as eCPRI/ORAN (for "Enhanced Common Public Radio Interface" and "Open Radio Access Network"). In a variant, the feeder link frames use the Q/bands or the C band. Thus the satellite SAT is at the interface between the feeder link frames and the service frames, enabling data to be carried by feeder link frames between the base stations gNB and the satellite SAT, and then by service frames between the satellite SAT and the mobile phone UE. The satellite SAT is, for example, a satellite travelling in a non-geostationary satellite orbit (NGSO), such as an LEO (low-earth orbit), vLEO (very low-earth orbit) or MEO (medium-earth orbit) satellite. The reference point of this satellite moves with respect to the base stations gNB, and this delay is highly variable; for example, it may be between 2 and 5 ms, with a rate of variation of as much as 25 ppm in the case where the satellite is in an orbit at 600 km.

The base stations gNB are adapted for transmitting uplink feeder link frames gNB UL and for receiving downlink feeder link frames gNB DL. Each base station gNB is composed of a central unit CU, a distributed unit DU for a baseband, and a radio unit RU.

The gateways Gate are positioned between the base stations gNB and the satellite SAT. They allow communication to take place between the wired environment of the base stations gNB and the radio environment associated with the satellite SAT.

The architecture of a payload CU comprises the Radio Unit (RRU) function on board the satellite SAT. The payload CU is connected to a distributed digital beam forming network for the downlink service frames UE DL directed towards the mobile terminal UE. This payload CU is also connected to the gateway Gate which provides connectivity to modems handling the downlink feeder link frames gNB DL directed towards the base stations gNB. In this case, the digital signals to be transmitted in the various beams formed by the antenna are carried via the eCPRI/ORAN protocol, according to the ORAN standard for example, from/to the base stations gNB or between the satellites SAT via the ISLs. The architecture of the payload CU corresponds to a functional split of 7-2/7-2x7-3. The RU function is responsible for converting the gNB signals (usually digital data in the I/Q form, carried according to the CPRI or eCPRI) into signals of the 5G radio interface with the mobile terminal UE. The data from the various beams are multiplexed in the feeder link, and the payload CU performs multiplexing/demultiplexing for the purpose of transmitting/receiving them in the corresponding beams in the user link Uu between the satellite SAT and the mobile terminal UE.

The invention proposes to provide the architecture of a payload CU in which the function RU is placed in the satellite, and is therefore remote from the gNB, while being capable of handling a large and variable delay between the satellite and gNB, which is not the case with current 5G terrestrial equipment.

The mobile phone UE belongs to a 5G cell forming part of a plurality of 5G cells. While moving, the user using the mobile phone UE may pass from one 5G cell to another.

Figure 2:
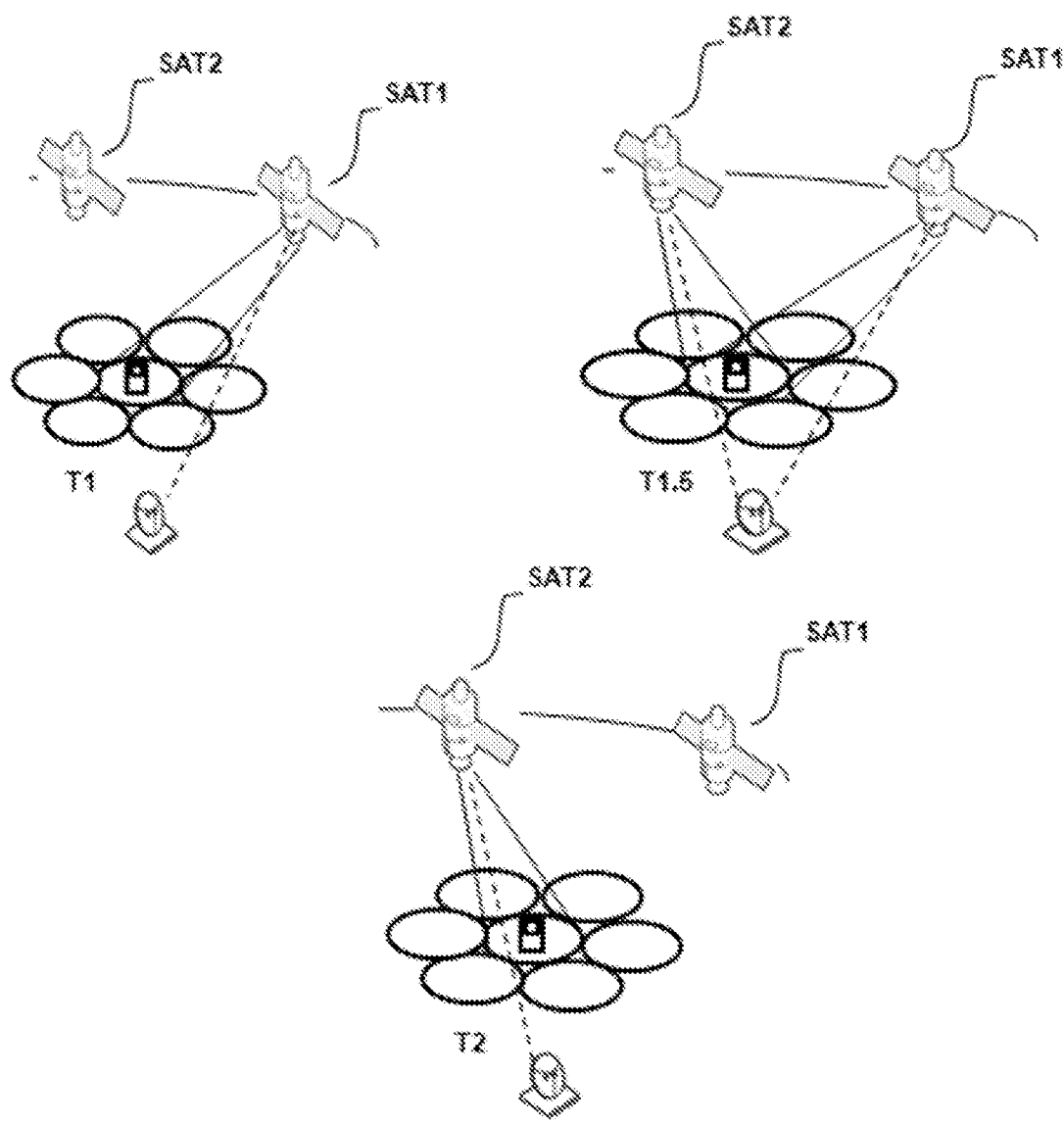
FIG. 2 shows the various steps of a handover between two satellites.

If two satellites SAT 1, SAT 2 successively overfly the same 5G cell comprising the mobile phone UE, a handover must be performed between these two satellites SAT 1, SAT 2 to ensure the continuity of the main beam. In a first time interval T1, shown on the left-hand side of FIG. 3, the first satellite SAT 1 serves the 5G cell. In a second time interval T1.5, shown in the central part of FIG. 2, the first satellite SAT 1 and the second satellite SAT 2 both serve the 5G cell. A handover may then begin between the first satellite SAT 1 and the second satellite SAT 2. In a third time interval T2, the handover has taken place and only the second satellite SAT 2 serves the 5G cell. The 5G cell will therefore switch between two different satellites. Since the 5G cell is a fixed cell, the handover is fairly simple to manage. The change of satellite takes place progressively, avoiding a handover rate that would be difficult for the core network CN and the base station gNB to handle.

Figure 3:
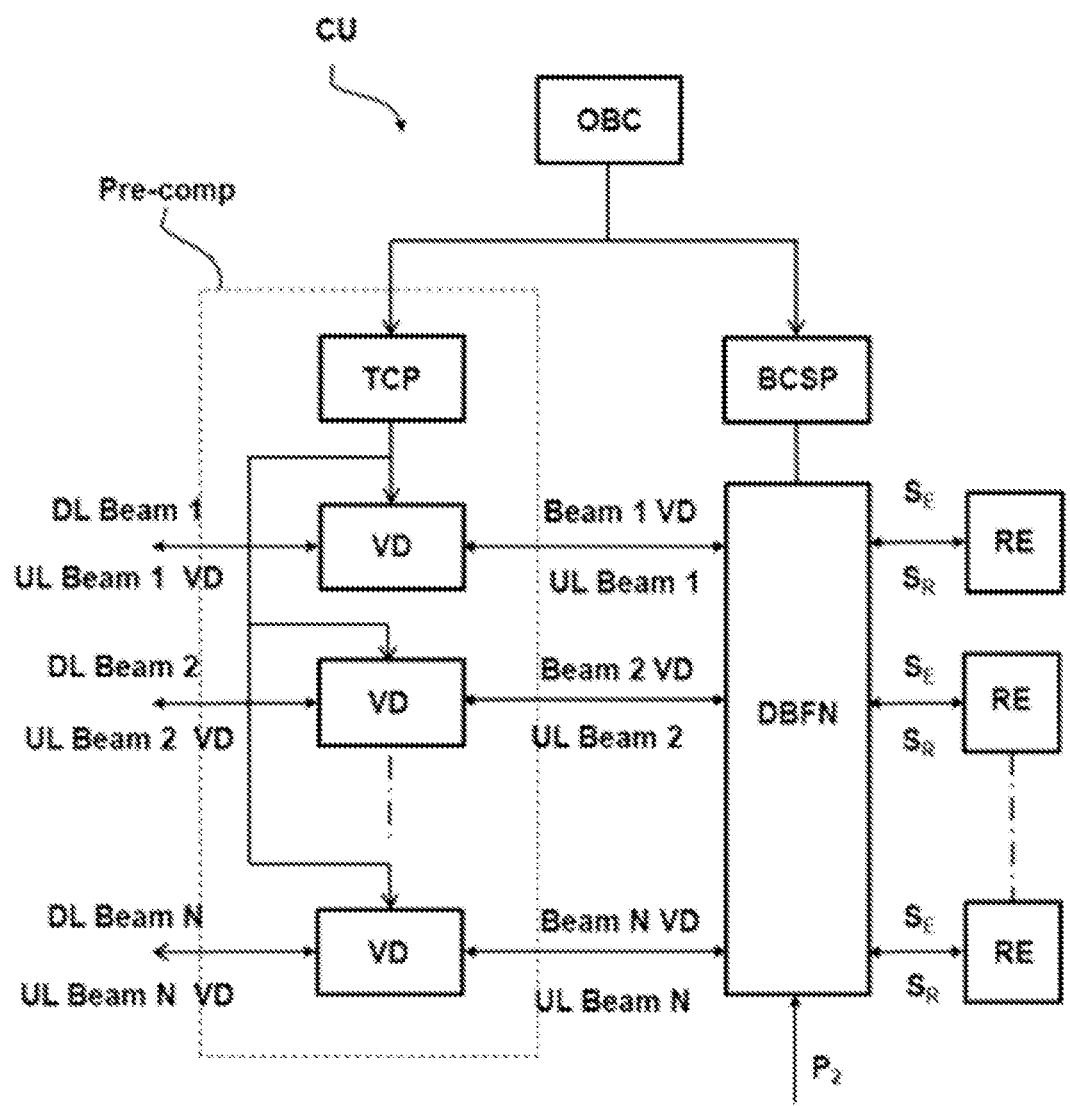
FIG. 3 shows a payload of the satellite of FIG. 1 comprising a pre-compensation device according to a first embodiment of the invention.

FIG. 3 shows a payload CU of the satellite SAT according to a first embodiment of the invention.

This payload comprises:
an on-board computer OBC;
a main beam orientation processor BCSP;
a plurality of radiating elements RE;
a digital stage DBFN;
a pre-compensation device Pre-comp.

The on-board computer OBC is adapted for obtaining parameters of the satellite SAT, such as the position, the velocity and the acceleration of this satellite.

The main beam orientation processor BCSP is adapted for orientating a main beam according to the parameters of the satellite so as to target the centre of the 5G cell.

Each radiating element of the plurality of radiating elements RE is adapted for transmitting, in a downlink mode DL, a transmission signal $S_E$ towards the target 5G cell. The transmission signal $S_E$ to be transmitted by the radiating element RE has previously been transmitted by the digital stage DBFN. Additionally, each radiating element of the plurality of radiating elements RE is adapted for receiving, in an uplink mode UL, a reception signal $S_R$ from the target 5G cell. The reception signal $S_R$ received by the radiating element is subsequently transmitted to the digital stage DBFN.

The digital stage DBFN is adapted for transmitting the various transmission signals $S_E$ towards the radiating elements RE in the downlink mode DL. The set of transmission signals $S_E$ forms a main beam in the downlink mode. Similarly, the digital stage DBFN is adapted for receiving the various reception signals $S_R$ from the radiating elements RE. The set of transmission signals $S_E$ forms a main beam in the uplink mode.

The pre-compensation device Pre-comp is adapted for compensating time differences in the exchange of the feeder link frames gNB UL, gNB DL, in order to time-align the uplink service frames UE UL and the downlink service frames UE DL. More particularly, the pre-compensation device Pre-comp comprises:
a time compensation processor TCP;
a variable delay module VD, for each incoming secondary beam DL Beam 1, DL Beam 2, DL Beam 3, and respectively for each outgoing secondary beam UL Beam 1, UL Beam 2, UL Beam 3. The variable delay module is adapted for providing an incoming secondary beam DL which is time-shifted by an amount pre-defined by the time compensation processor TCP. Similarly, each outgoing secondary beam UL Beam 1 VD, UL Beam 2 VD, UL Beam N VD is shifted with respect to an outgoing secondary beam UL Beam 1, UL Beam 2, UL Beam N from the digital stage DBFN.

The time compensation processor TCP is adapted for calculating the time interval $\Delta t_{SAT}$ between the satellite SAT and the centre O of the 5G cell addressed, on the basis of the position and velocity of this satellite.

Thus:

$$\Delta t_{SAT} = \frac{|\vec{d}|}{c}$$

$$\Delta t_{SAT} = \frac{\sqrt{(P_x^{SAT} - P_x^{CELL_i})^2 + (P_y^{SAT} - P_y^{CELL_i})^2 + (P_z^{SAT} - P_z^{CELL_i})^2}}{c}$$

In each slot (1 ms) the compensation is updated.

Based on a FIFO (First In, First Out) system controlled by the timing variations:
when the timing increases, the FIFO system is progressively emptied to compensate for the increase in the delay;
when the timing decreases, the FIFO system is progressively filled to compensate for the decrease in the delay.

This enables $\Delta t_{UE} = \Delta t_{SAT} + \Delta t_{FIFO}$ to remain constant in order to mask the variations of $\Delta t_{SAT}$. The FIFO system must be designed so that $\Delta t_{FIFO\_MAX} = \Delta t_{SAT\_MAX} - \Delta t_{SAT\_MIN}$.

The digital stage DBFN is adapted for forming a main beam from the outgoing secondary beams UL Beam 1 VD, UL Beam 2 VD, . . . , UL Beam N VD. For this purpose, the digital stage DBFN determines a direction of the main beam on the basis of the parameters of the satellite (position, velocity, acceleration) and the centre O of the 5G cell. These parameters of the satellite and the centre O of the 5G cell are supplied by the main beam orientation processor BCSP.

Figure 5:
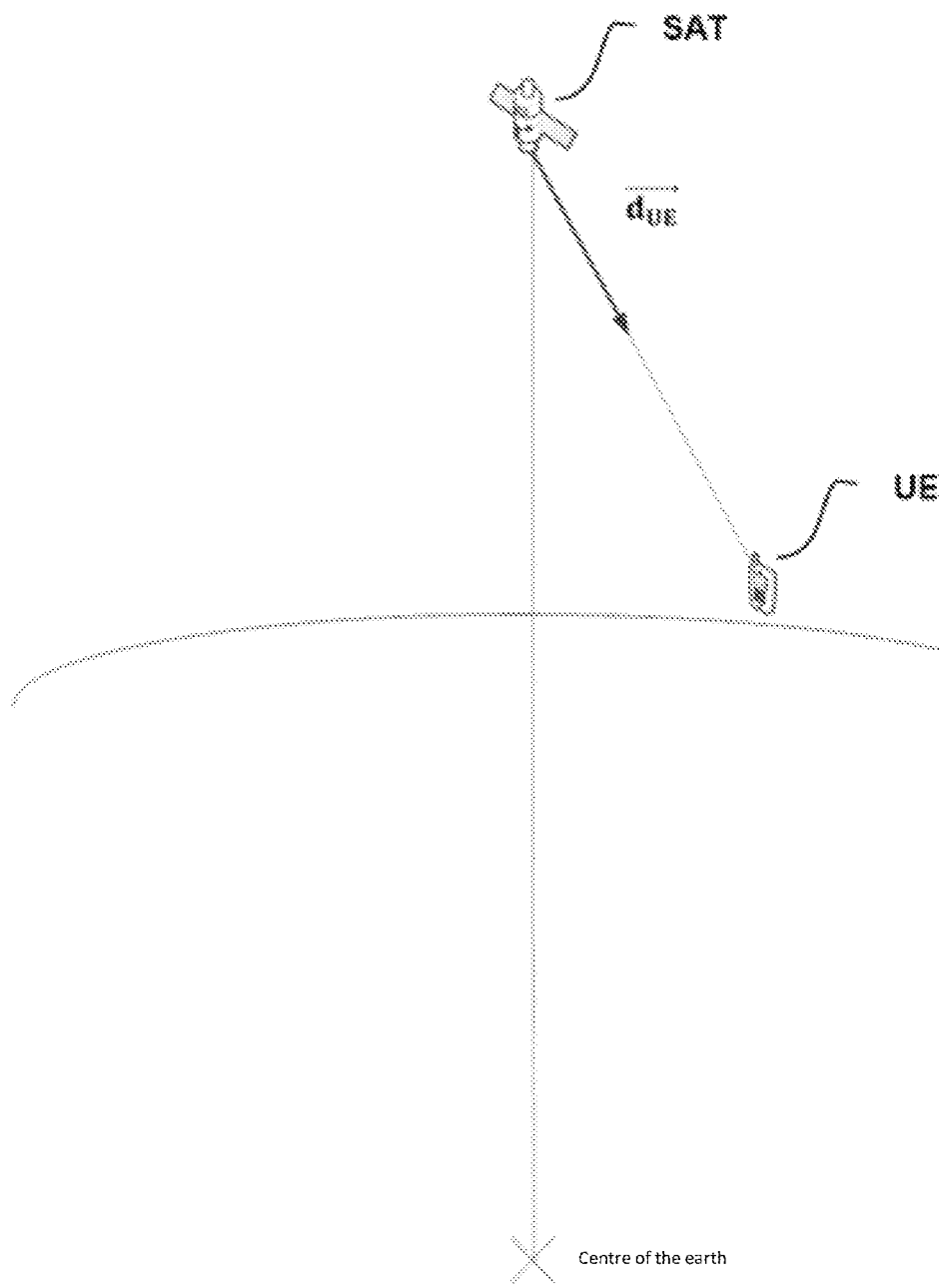
FIG. 5 shows the calculation of a direction vector of the mobile terminal of FIG. 1.

As shown in FIG. 5, the direction vector $\overrightarrow{d_{UE}}$ of the mobile terminal UE is determined according to the following equation:

$$\overrightarrow{d_{UE}} = \left( P_x^{CELL_i} - P_x^{SAT}, P_y^{CELL_i} - P_y^{SAT}, P_z^{CELL_i} - P_z^{SAT} \right)$$

Figure 6:
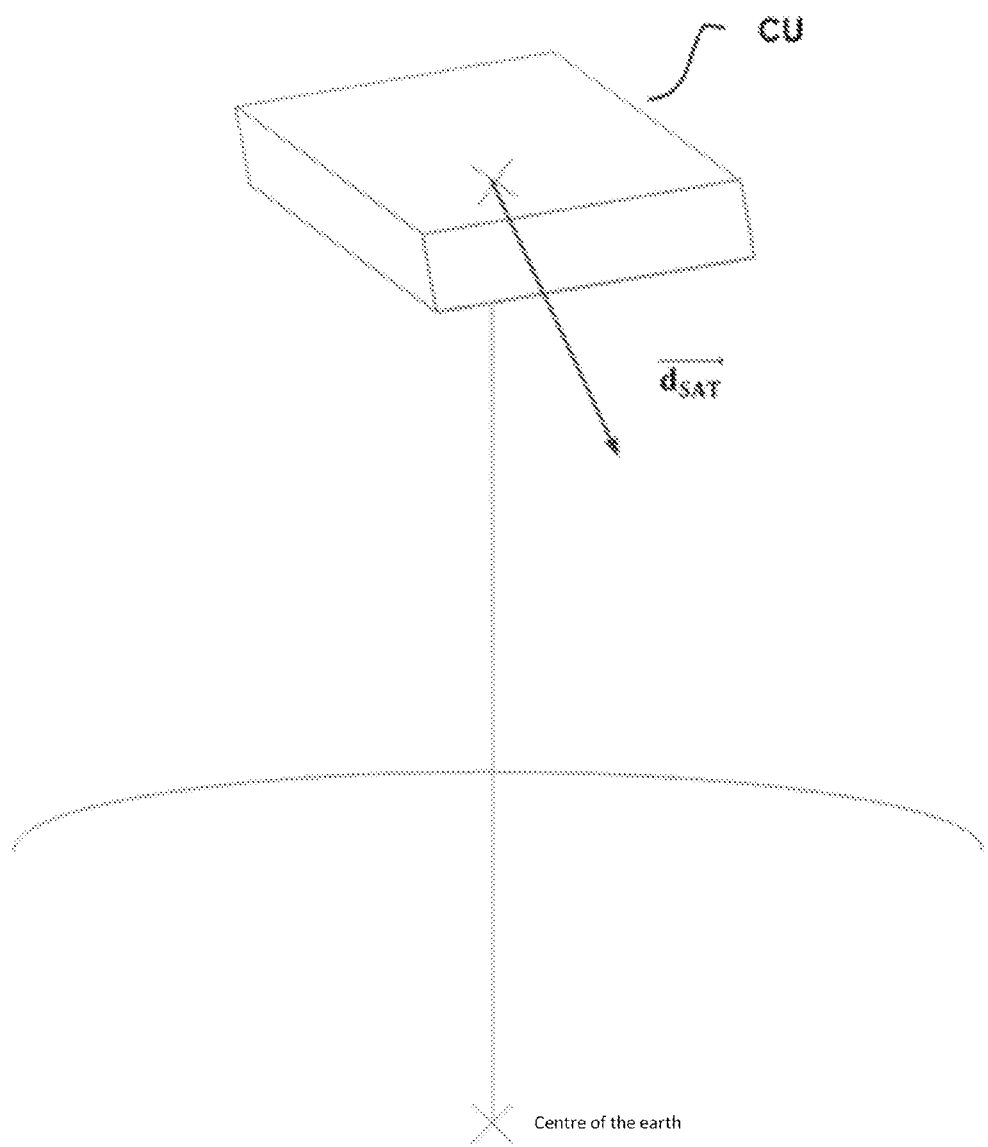
FIG. 6 shows the calculation of a direction vector of the satellite of FIG. 1.

FIG. 6 shows the direction vector $\overrightarrow{d_{SAT}}$ of the satellite SAT.

$\overrightarrow{d_{SAT}}$ is the direction of the normal of the antenna with respect to a reference of the centre of the earth, as $\overrightarrow{d_{UE}}$. In the same way as for the beam forming, the important factor is the direction $\vec{d}$ with respect to the normal of the antenna. The vector $\overrightarrow{d_{UE}}$ must be placed in the reference frame of the satellite antenna.

Thus, $\vec{d} = \overrightarrow{d_{UE}} - \overrightarrow{d_{SAT}}$

Figure 7:
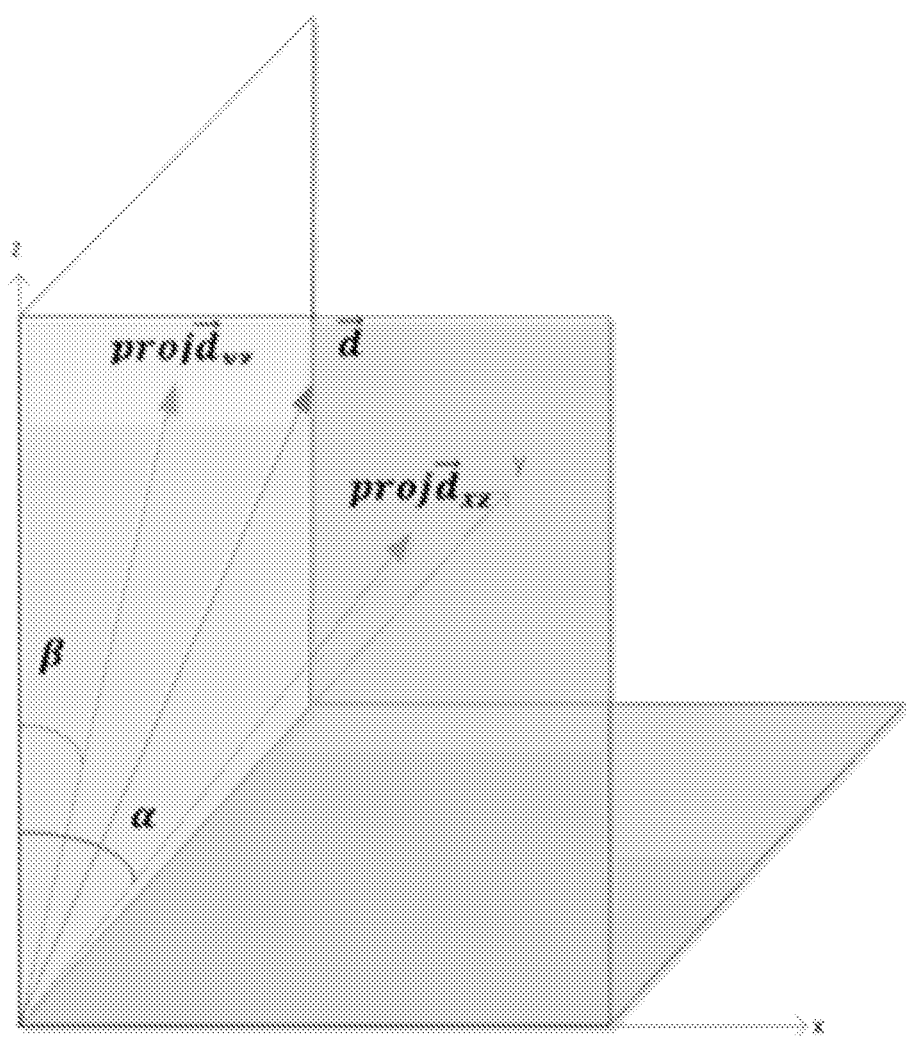
FIG. 7 shows a projection of the direction vector of FIG. 6 in a reference frame of the antenna of the satellite of FIG. 1.
Figure 8:
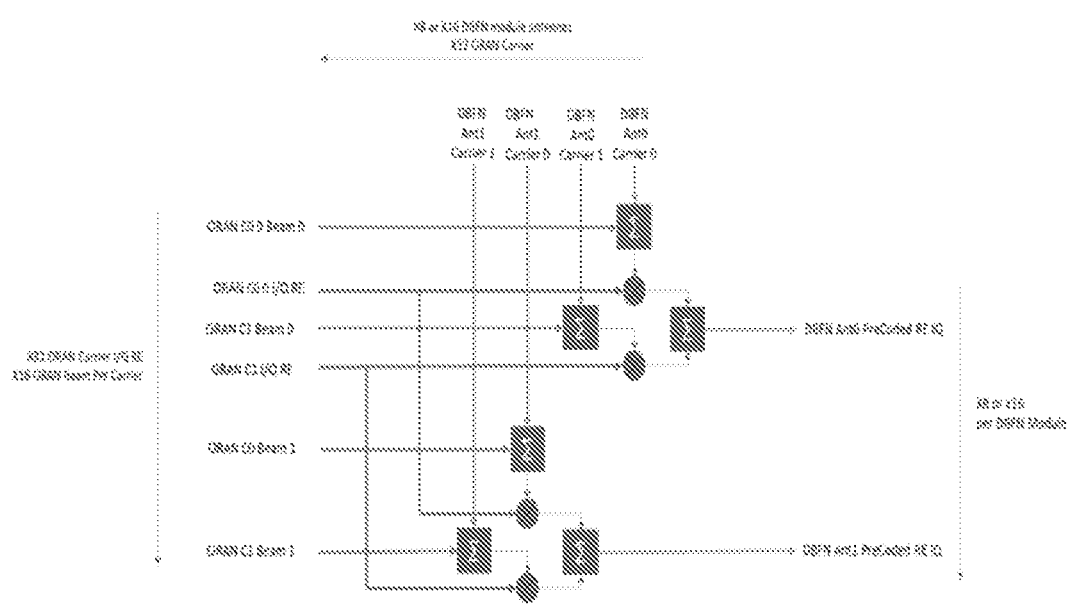
FIG. 8 shows a combination of pre-coding and pre-compensation carried out according to FIG. 3 or FIG. 4 by a payload of the satellite of FIG. 1.

FIG. 7 shows a projection of the direction vector $\overrightarrow{d_{SAT}}$ in a reference frame of the satellite antenna.

Firstly, two angles are determined on the basis of the normal of the antenna:

α, which is the angle between the normal of the antenna (axis Z) and the projection of $\vec{d}$ on the plane (xy), called $\text{proj}\vec{d}_{xy}$;

β, which is the angle between the normal of the antenna (axis Z) and the projection of $\vec{d}$ on the plane (xy), called $\text{oj}\vec{d}_{yz}$.

Here, we start from the centre of the cell direction vector.

The direction with respect to the normal of the DRA (Direct Radiating Antenna) panel may be used to determine phase laws to be applied when forming the beam that will illuminate the 5G cell. This DRA panel is carried by a rectangular antenna comprising the set of radiating elements RE.

Given the two angles α, β, the direction angles of the rectangular antenna can now be calculated, using the following algorithm:

Let S be the distance between the centres of the consecutive radiating elements in the two axes of the antenna (x and y);

Let $N_x^{RE}$ be the number of radiating elements in the axis x;

Let $N_y^{RE}$ be the number of radiating elements in the axis y;

Let λ be the wavelength of the signal to be formed.

First weights are determined in the following manner on the basis of data obtained from the pre-compensation device Pre-comp:

for $k_x=0$ to $N_x^{RE}-1$
for $k_y=0$ to $N_y^{RE}-1$ $$d_x = k_x \cdot S$$

$$d_y = k_y \cdot S$$

$$W_{x,y} = e^{-2\pi \cdot \frac{i}{\lambda} \cdot (\sin(\beta)\cdot\cos(\alpha)\cdot d_x + \sin(\beta)\cdot\sin(\alpha)\cdot d_y)}$$

The forming weights that are calculated by the pre-compensation mechanism must be combined with second weights $P_2$. These second weights $P_2$ are found by a distributed unit of the base station gNB. The weighting step between the secondary beams, for combining these weights between the pre-compensation and the information for the downlink part, is shown in FIG. 10.

Figure 4:
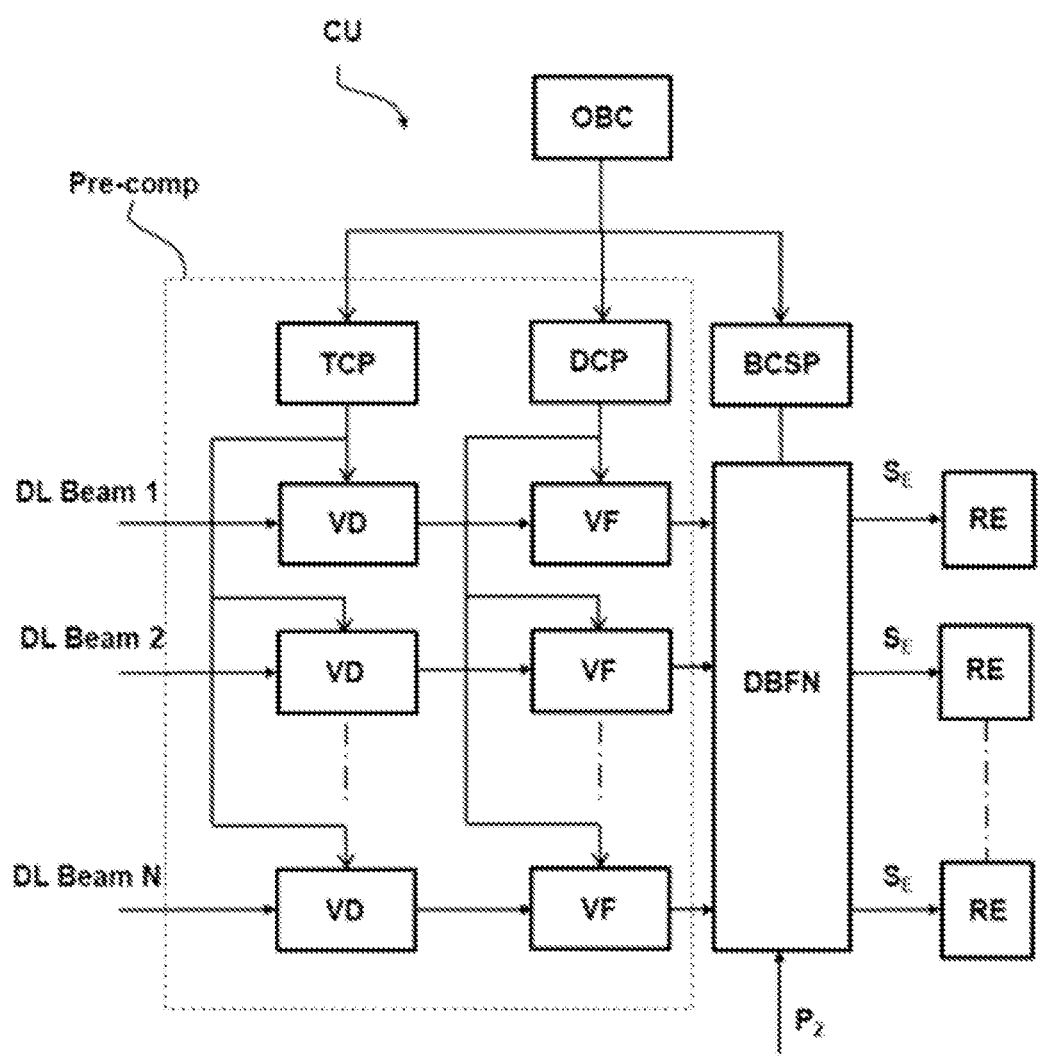
FIG. 4 shows a payload of the satellite of FIG. 1 comprising a pre-compensation device according to a second embodiment of the invention.

FIG. 4 shows a payload CU of the satellite SAT according to a second embodiment of the invention.

The operation of the payload CU is shown here in a downlink mode DL. Evidently, this operation may be transposed to the uplink mode UL.

In addition to the elements of the pre-compensation module disclosed in FIG. 4, the pre-compensation module of FIG. 5 also comprises:

a Doppler compensation processor DCP;
N shift modules with a variable frequency VF.

The pre-compensation device Pre-comp is thus adapted for compensating time differences and frequency differences in the exchange of the feeder link frames gNB UL, gNB DL, in order to time-align the uplink service frames UE UL and the downlink service frames UE DL.

The processor DCP is adapted for determining a frequency offset value, called the frequency shift. This value is then transmitted to the different variable frequency shift modules VF. Each variable frequency shift module VF is adapted for supplying to the digital stage DBFN an incoming secondary beam DL that is frequency shifted, based on a beam that has been time-shifted in advance by one of the variable delay modules VD. Each incoming secondary beam DL Beam 1, DL Beam 2, . . . , DL Beam N is therefore processed by one of the variable delay modules VD and one of the variable frequency modules VF, before reaching the digital stage DBFN.

Because of the velocity and acceleration of the satellite, frequency shift and a shift rate are calculated on the basis of:

the position, velocity and acceleration of the satellite;
a central frequency of the main beam;
the position of the centre of the cell to be compensated.

The compensation is updated in each section (1 ms).

The first step is then to create a projection of satellite velocity and acceleration towards the centre of the cell.

$$\vec{d} = \left( P_x^{CELL_i} - P_x^{SAT}, P_y^{CELL_i} - P_y^{SAT}, P_z^{CELL_i} - P_z^{SAT} \right)$$

$$\text{proj}\vec{v_d} = \frac{\vec{v} \cdot \vec{d}}{|\vec{d}|^2}$$

$$\text{proj}\vec{a_d} = \frac{\vec{a} \cdot \vec{d}}{|\vec{d}|^2}$$

The Doppler and the variation of the Doppler may be calculated as follows:

$$f_d = \text{proj}\vec{v_d} \cdot \frac{f}{c}$$

$$\Delta f_d = \text{proj}\vec{a_d} \cdot \frac{f}{c}$$

An offset and a rate of change of frequency of opposite sign is then applied to the signal to pre-compensate this shift.

Thus the invention provides the following advantages:

The pre-compensation allows mobile terminals to be used without any change in their behaviour that would make them incompatible with the future release 17 of 5G NR;

The pre-compensation takes place on the basis of the centre of the cell, in both downlink and uplink mode;

The cells on the ground are fixed, thus reducing the requirement for logical/physical transformation in the core network CN and in the mobile terminal;

The satellite, and in particular the digital stage DBFN, form the beams so as to be constantly aimed at the cell, which covers a fixed region on the ground.

Only the base station gNB and the satellite have to be modified, and the effect of the modifications made to the communication system is therefore limited.

By introducing both pre-compensation for the terminals and layers of abstraction with the core network, the proposed solution makes it possible to use commercially available terminals and core network equipment.

The invention claimed is:

1. A method for pre-compensation of time differences for the time alignment of uplink service frames (UE UL) and downlink service frames (UE DL), said uplink service frames (UE UL) and said downlink service frames (UE DL) being exchanged between a multi-radiating element antenna in a satellite (SAT) and a mobile terminal (UE) in a main beam, said mobile terminal (UE) being adapted for providing 5G communications, wherein, the mobile terminal (UE) belonging to a 5G cell comprising a cell centre (O), the time pre-compensation is calculated and applied in the satellite on the basis of a main beam directed towards the centre (O) of said 5G cell, multiplexing and demultiplexing CPRI signals being performed in the satellite for the purpose of transmitting or receiving in a user link, a variable delay module, for each secondary beam, providing time-shifting for secondary beams, a main beam being formed from the secondary beams in the satellite including determining a direction of the main beam on the basis of position, velocity and acceleration parameters of the satellite and the centre of the 5G cell, weights determined by a base station of the 5G communication system being used to combine the secondary beams into the main beam in the antenna, between the time pre-compensation and the downlink part.

2. The method according to claim 1, wherein said pre-compensation is carried out on the downlink service frames (UE DL) and/or on the uplink service frames (UE UL).

3. The method according to claim 1, wherein the pre-compensation is calculated on the basis of a position, a velocity and/or an acceleration of the satellite (SAT).

4. The method according to claim 1, wherein said method further includes a Doppler pre-compensation for compensating frequency differences.

5. The method according to claim 4, wherein the Doppler pre-compensation is calculated on the basis of at least one parameter from a list of parameters comprising:
a position of the satellite;
a velocity of the satellite;
an acceleration of the satellite;
a central frequency;
the position of the centre of the cell.

6. A payload of a satellite (SAT) comprising a device for pre-compensation of time differences for the purpose of time-aligning uplink service frames (UE UL) and downlink service frames (UE DL), said uplink service frames (UE UL) and said downlink service frames (UE DL) being exchanged between a satellite (SAT) and a mobile terminal (UE), said mobile terminal (UE) being adapted for providing 5G communications with the access network, wherein, the mobile terminal (UE) belonging to a 5G cell comprising a cell centre (O), the pre-compensation is calculated and applied on the basis of a main beam directed towards the centre (O) of said 5G cell.

7. The payload of a satellite (SAT) according to claim 6, wherein said downlink service frames (UE DL) are exchanged between a multi-radiating element antenna in the satellite (SAT) and the mobile terminal (UE) in the main beam.

8. The payload of a satellite (SAT) according to claim 6, wherein multiplexing and demultiplexing CPRI signals are performed in the satellite for the purpose of transmitting/receiving in the user link, a variable delay module, for each secondary beam, providing time-shifting for secondary beams, a main beam being formed from the secondary beams in the satellite including determining a direction of the main beam on the basis of position, velocity and acceleration parameters of the satellite and the centre of the 5G cell, weights determined by a base station of the 5G communication system being used to combine the secondary beams into the main beam in the antenna, between the pre-compensation and the downlink part.

9. A communication system for 5G communication between at least one mobile terminal (UE) and an access network comprising a plurality of base stations (gNB), said communication system comprising at least one satellite (SAT), at least one base station of the plurality of base stations (gNB) and a gateway (Gate) positioned between said satellite (SAT) and said base station (gNB), said satellite (SAT) and said gateway (Gate) being capable of exchanging feeder link frames (gNB UL, gNB DL), said mobile terminal (UE) and said satellite (SAT) being capable of exchanging service frames (UE UL, UE DL) in a main beam, said satellite (SAT) being at the interface between the feeder link frames (gNB UL, gNB DL) and the service frames (UE UL, UE DL) for the exchange of data between the mobile terminal and the base station (gNB), said service frames (UE UL, UE DL) comprising uplink service frames (UE UL) and downlink service frames (UE DL), said uplink service frames (UE UL) having to be time-aligned with said downlink service frames (UE DL), said communication system comprising a pre-compensation device adapted for compensating time differences for the purpose of time-aligning the uplink service frames (UE UL) and the downlink service frames (UE DL), and wherein, the mobile terminal (UE) belonging to a 5G cell comprising a cell centre (O), the pre-compensation is calculated on the basis of a main beam directed towards the centre (O) of said 5G cell.

10. The communication system according to claim 9, wherein said pre-compensation is carried out on the downlink service frames (UE DL) and/or on the uplink service frames (UE UL).

11. The communication system according to claim 9, wherein the pre-compensation is calculated on the basis of a position, a velocity and/or an acceleration of the satellite (SAT).

12. The communication system according to claim 9, wherein said system includes means for a Doppler pre-compensation for compensating frequency differences.

13. The communication system according to claim 12, wherein the Doppler pre-compensation is calculated on the basis of at least one parameter from a list of parameters comprising:
a position of the satellite;
a velocity of the satellite;
an acceleration of the satellite;
a central frequency;
the position of the centre of the cell.

* * * * *